US011520169B2

(12) United States Patent
Peli et al.

(10) Patent No.: US 11,520,169 B2
(45) Date of Patent: Dec. 6, 2022

(54) EXPANSION OF FIELD OF VIEW

(71) Applicants: The Schepens Eye Research Institute, Inc., Boston, MA (US); University of Murcia, Murcia (ES)

(72) Inventors: Eliezer Peli, Boston, MA (US); Fernando Vargas-Martin, Murcia (ES)

(73) Assignees: THE SCHEPENS EYE RESEARCH INSTITUTE, INC., Boston, MA (US); THE UNIVERSITY OF MURCIA, Murcia (ES)

( * ) Notice: Subject to any disclaimer, the term of this patent is extended or adjusted under 35 U.S.C. 154(b) by 316 days.

(21) Appl. No.: 16/754,224

(22) PCT Filed: Oct. 11, 2018

(86) PCT No.: PCT/US2018/055461
§ 371 (c)(1),
(2) Date: Apr. 7, 2020

(87) PCT Pub. No.: WO2019/075235
PCT Pub. Date: Apr. 18, 2019

(65) Prior Publication Data
US 2021/0199993 A1 Jul. 1, 2021

Related U.S. Application Data

(60) Provisional application No. 62/571,217, filed on Oct. 11, 2017.

(51) Int. Cl.
*G02C 7/02* (2006.01)
*G02C 7/08* (2006.01)
*G02C 11/00* (2006.01)
(52) U.S. Cl.
CPC .............. *G02C 7/086* (2013.01); *G02C 11/10* (2013.01); *G02C 2202/06* (2013.01)

(58) Field of Classification Search
CPC ...... G02C 2202/06; G02C 7/086; G02C 7/08; G02C 7/02; G02C 11/10; G02C 11/00
(Continued)

(56) References Cited

U.S. PATENT DOCUMENTS 3,484,149 A  12/1969 Becker et al.
7,374,284 B2  5/2008 Peli
(Continued)

FOREIGN PATENT DOCUMENTS

WO  2014068482 A1  5/2014
WO  2017078860 A1  5/2017

OTHER PUBLICATIONS

"High-Power Prismatic Devices May Further Expand Visual Fields for Patients with Hemianopia", Massachusetts Eye and Ear, May 17, 2016, 4 pages.

*Primary Examiner* — William R Alexander
(74) *Attorney, Agent, or Firm* — Tarolli, Sundheim, Covell & Tummino LLP

(57) ABSTRACT

An implementation of an optical system for expanding the field of view can include a first optical element and a second optical element. The first optical element can include a first surface and a second surface. The first surface can be configured to reflect a first light beam incident on the first surface at a first incident angle greater than a first predetermined angle, and the second surface can be configured to reflect the reflected first light beam towards a location. The second optical element can include a third surface and a fourth surface. The third surface can be configured to reflect a second light beam incident on the third surface at a second incident angle greater than a second predetermined angle, and the fourth surface can be configured to reflect the
(Continued)

reflected second light beam towards the location. Related apparatus, systems, techniques and articles are also described.

20 Claims, 15 Drawing Sheets

(58) Field of Classification Search
 USPC .................................................. 351/159.58
 See application file for complete search history.

(56) References Cited

U.S. PATENT DOCUMENTS

| | | |
|---|---|---|
| 7,817,341 B2 | 10/2010 | Penn |
| 8,917,459 B2 | 12/2014 | Klein et al. |
| 9,541,740 B2 | 1/2017 | Georgiev |
| 2012/0057242 A1* | 3/2012 | Takahashi .......... G02B 27/0172 359/859 |
| 2014/0340285 A1* | 11/2014 | Hiraide .............. G02B 27/0172 345/8 |

* cited by examiner

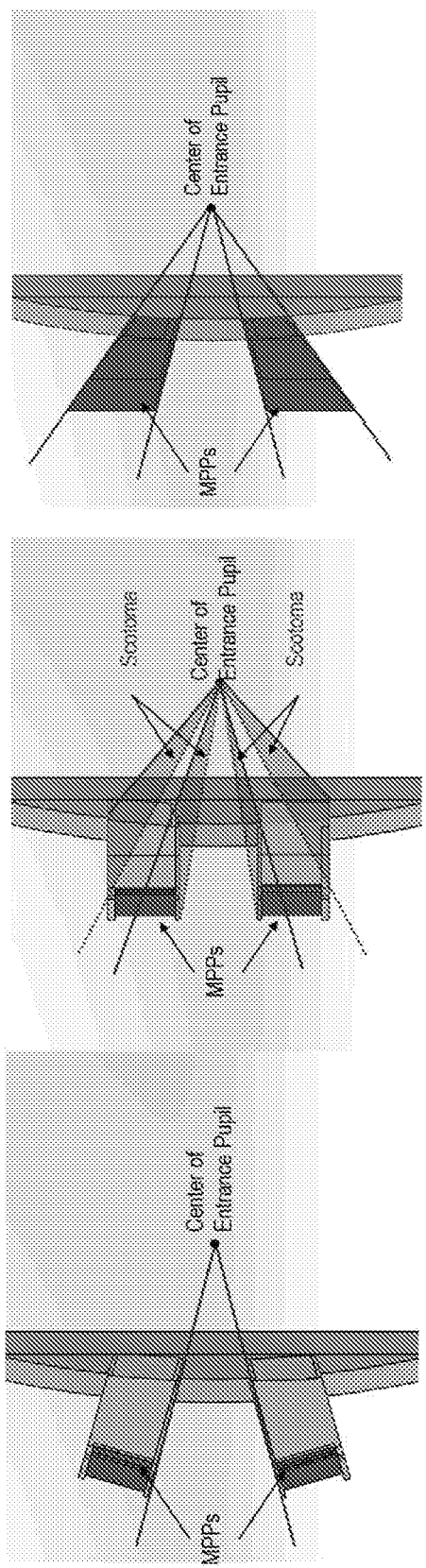
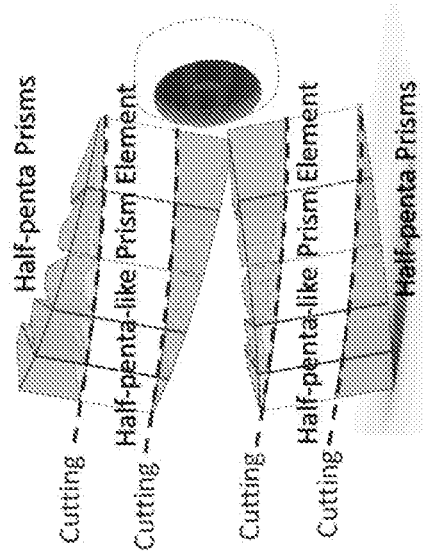
FIG. 5A
FIG. 5B
FIG. 5C
FIG. 5D
FIG. 5E

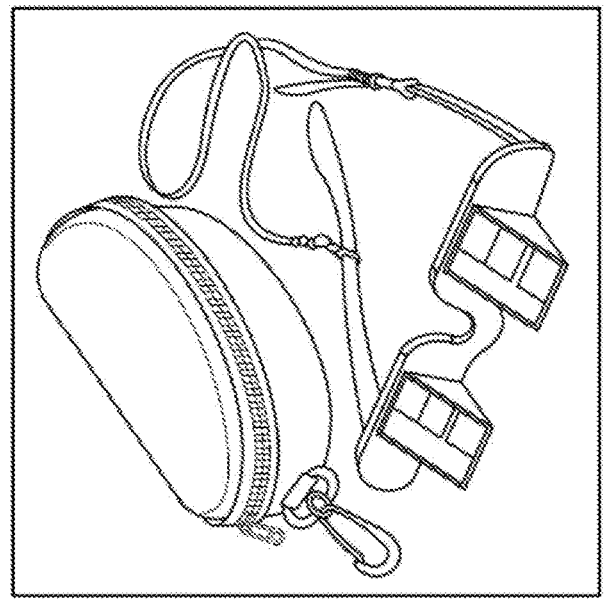
*FIG. 14B*
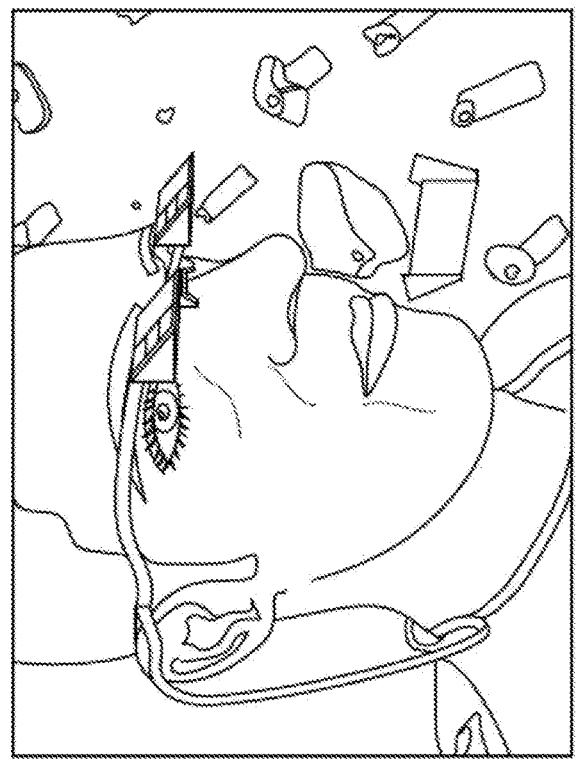
*FIG. 14A*
*FIG. 14*

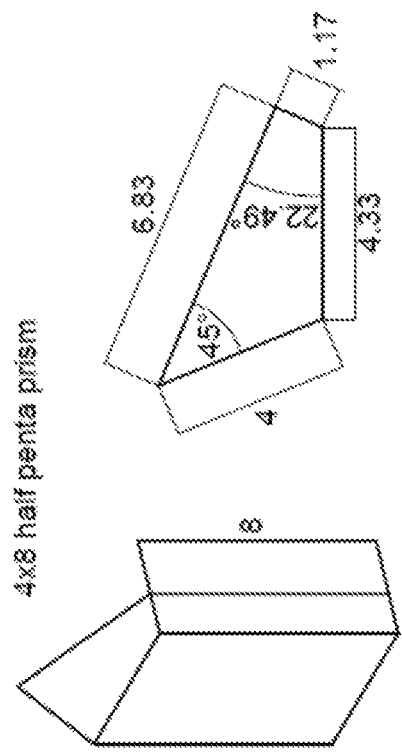
FIG. 15A
FIG. 15B
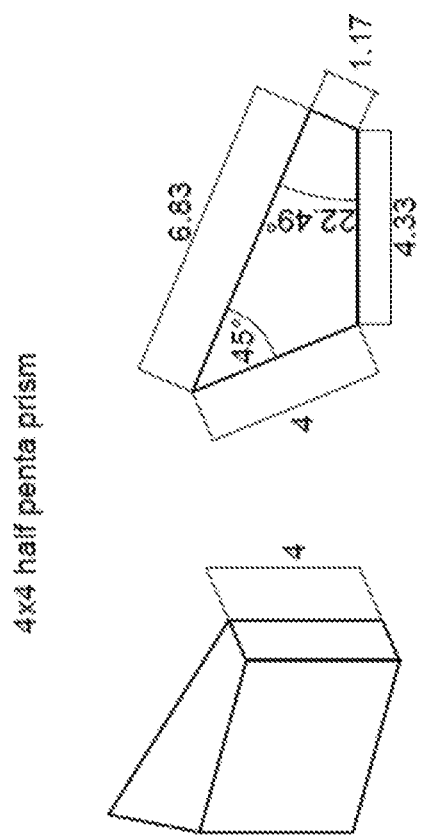
FIG. 15C
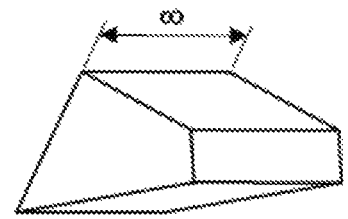
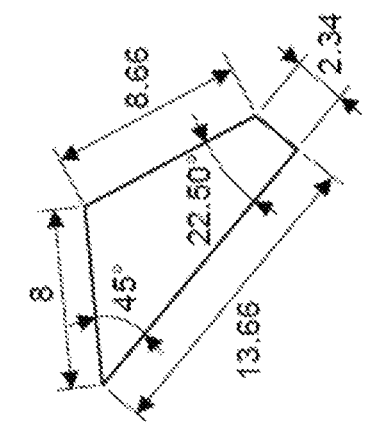
FIG. 15D
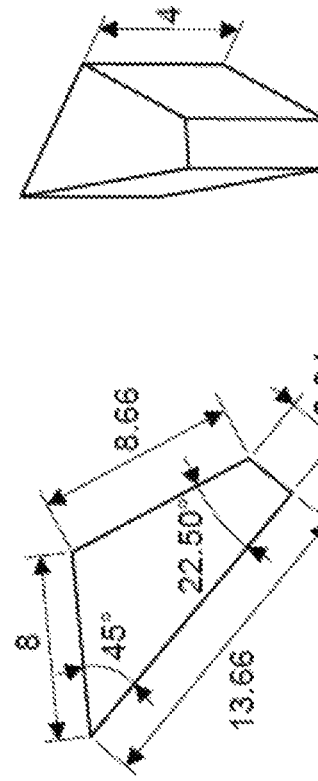

EXPANSION OF FIELD OF VIEW

CROSS-REFERENCE TO RELATED APPLICATION

This application is a national stage application filed under 35 U.S.C. § 371, of International Patent Application No. PCT/US18/55461 filed Oct. 11, 2018, which claims the benefit of and priority under 35 U.S.C. § 119(e) to U.S. Provisional Patent Application No. 62/571,217 filed on Oct. 11, 2017, the entire contents of each of which is hereby expressly incorporated by reference herein.

STATEMENT REGARDING FEDERALLY SPONSORED RESEARCH OR DEVELOPMENT

This invention was made with government support under R01EY023385 awarded by the National institutes of Health. The government has certain rights in the invention.

TECHNICAL FIELD

The subject matter described herein relates to systems and methods of expansion of field of view.

BACKGROUND

Stroke, head injury and tumors commonly can cause loss of peripheral vision in a condition called Hemianopia. The number of disabled stroke survivors in the United States is estimated to be more than 3 million annually. As many as one third of stroke survivors in rehabilitation have either Homonymous Hemianopia or Hemineglect Hemianopia. Homonymous Hemianopia, which is considered to be a visual field defect, is the loss of half of the visual field on one side in both eyes. Due to reduction of the field of view, life of a patient can be severely affected. For example, it can lead to difficulties with general mobility (obstacle detection and navigation), as people with Homonymous Hemianopia are likely to walk into obstacles such as furniture or objects on the floor on the side of the field loss.

Prism glasses are commonly used to expand the field of view of the patients suffering from field of view glasses. However, the current prism glasses are limited in their ability to expand the field of view (e.g., field view expansion of about 30 degrees), and are unable to reduce collisions that can require further expansion of the field of view. In addition, the prism glasses can distort an image (e.g., minified), and reduce image contrast (e.g., generate false colors). Additionally, when patients scan into their blind side to see farther, the prism glasses can limit the effective range of eye scanning with continued expansion to only 5 degrees.

SUMMARY

In an aspect, an optical system for expanding the field of view can include a first optical element and a second optical element. The first optical element can include a first surface and a second surface. The first surface can be configured to reflect a first light beam incident on the first surface at a first incident angle greater than a first predetermined angle, and the second surface can be configured to reflect the reflected first light beam towards a location. The second optical element can include a third surface and a fourth surface. The third surface can be configured to reflect a second light beam incident on the third surface at a second incident angle greater than a second predetermined angle, and the fourth surface can be configured to reflect the reflected second light beam towards the location. The optical system can be configured to shift an image laterally from a first region to a second region, the image characterized h the first light beam and the second light beam One or more of the following features can be included in any feasible combination. For example, the second surface of the first optical element and the third surface of the second optical element form an angle. In some implementations, the optical system can include a third optical element that can include a fifth surface and a sixth surface. The fifth surface can be configured to reflect a third light beam incident on the fifth surface at an angle greater than a third predetermined angle, and the sixth surface can be configured to reflect the reflected third light beam towards the location.

In some implementations, the first optical element and the second optical element can include Bauernfeind prisms. In some implementations, the second surface and the fourth surfaces include a silver layer configured to reflect the reflected first light and the reflected second light beam, respectively. In some implementations, the first light beam can be incident on the first surface at the angle greater than the first predetermined angle such that the first light beam can be totally internally reflected by the first surface.

In some implementations, the first optical element and the second optical element can be arranged to define a volume between the second surface and the third surface. The first optical element can be formed of a first material having a first refractive index and the volume between the second surface and the third surface can be formed of a second material having a second refractive index. The first refractive index can be greater than the second refractive index. The first material can be glass and the second material can be ambient air.

In some implementations, the second surface can be adjacent the third surface and can define a separation angle. In some implementations, the optical system can include a housing configured to hold the first optical element and the second optical element. The housing can be configured to be attachable to a spectacle lens. The housing can be integral with a lens. The optical system can include a spectacle frame for holding a lens, wherein the housing is attached to the lens. The optical system can also include an image acquisition device. The housing can be configured to locate the optical elements in a field of view of the image acquisition device.

In some implementations, the image is shifted by greater than 30 degrees. In some implementations, the image can be shifted by one of 45 degrees and 60 degrees. In some implementations, the lateral shift can be with respect to a plane perpendicular to a primary viewing axis. In some implementations, the first optical element and the second optical element can form part of a distributed cascade of elements.

The details of one or more variations of the subject matter described herein are set forth in the accompanying drawings and the description below. Other features and advantages of the subject matter described herein will be apparent from the description and drawings, and from the claims.

DESCRIPTION OF DRAWINGS

FIGS. 5A-E illustrate optical systems designed using half penta prisms;

FIGS. 14A-B illustrate applications of half penta prisms; and

FIGS. 15A-D illustrate geometries of various prisms in a field of view expanding optical system.

Like reference symbols in the various drawings indicate like elements.

DETAILED DESCRIPTION

Individuals suffering from loss of visual field (e.g., due to hemianopia, glaucoma and the like) in one or both eyes may have a limited field of view. It can be desirable to develop an optical system that can expand a patient's field of view to regions that the patient cannot see due to loss of visual field, and improve the quality of an image (e.g., by reducing image distortion, improving image contrast, and the like). This can be done, for example, by redirecting light beams emanating from regions of visual loss into the field of view of the patient. The light beams can be redirected by optical elements (e.g., Bauernfeind prisms) using various optical phenomena (e.g., reflection, total internal reflection, refraction and the like). Based on the choice of the optical elements, their orientation and geometric arrangement, the field of view of the patient can be expanded (e.g., by 45 degrees, by 60 degrees and the like), and a high quality image of the region of visual loss can be generated.

In some implementations, the current subject matter can include a distributed cascade of optical elements that are arranged with respect to one another and a location of viewing such that only a single surface of the optical elements needs to be silvered (e.g., totally reflective). In other words, for an optical element in the distributed cascade, one of at least two total reflective surfaces can be transparent at some angles of incidence (e.g., not silvered). This can be achieved by arranging the optical element such that light from a direction of interest impinges the non-silvered surface at an angle of interest below its critical angle such that there is total internal reflection. By utilizing geometries to take advantage of total internal reflection, silvering both reflective surfaces need not occur, which can overcome challenges during manufacturing.

Figure 1:
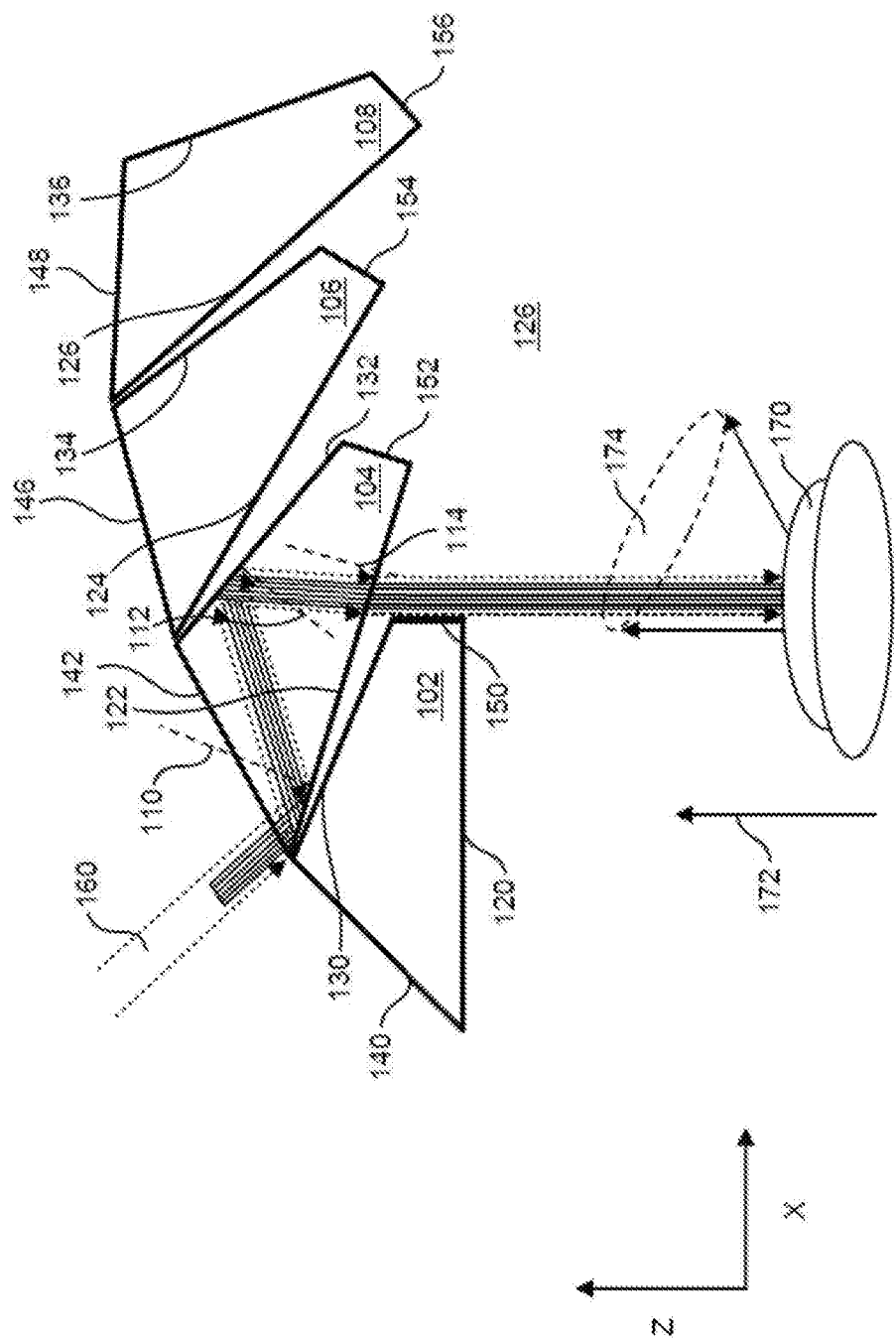
FIG. 1 illustrates an optical system for expanding the field of view.

FIG. 1 is a schematic illustration of an optical system 100 that can expand the field of view of an eye 170. The optical system 100 includes optical elements (e.g., Bauernfeind prisms) that can redirect a beam of light from regions of visual loss to the field of view of the patient. For example, as illustrated in FIG. 1, eye 170 has a field of view 174. As a result, eye 170 is unable to detect a light beam (e.g., light beam 160) from a region of visual loss that lies outside the field of view 174. The field of view 174 can be expanded by redirecting the light beam (from outside the field of view) into the field of view 174. The redirection of light beam can involve changing the angle of the direction of light beam propagation with respect to a field of view axis 172 of the eye 170. Due to redirection of the light beam, images associated with the light beam appear to be shifted in space (e.g., images appear to be shifted in a plane perpendicular to the field of view axis 172). As a result, the field of view can expand (e.g., by 45 degrees, by 60 degrees, and the like). For example, when a light beam in the region of visual loss and having an incidence angle of 45 degrees (with respect to the field of view axis 172) is redirected into the field of view 174 of the eye 170, the field of view can be said to be expanded by 45 degrees.

The optical system 100 includes optical elements 102, 104, 106, and 108 that can redirect light beams into the field of view 174 of the eye 170. The optical elements can be made of, for example, glass (fused silica), quartz, plastic and the like. The optical element (e.g. optical element 104) includes several surfaces (e.g., surfaces 122, 132, 142, 152, and the like) at which the light beam can undergo reflection/refraction of light. For example, light beam 160 from a region of visual loss can impinge on surface 122 after transmission through the image facing surface 142. The surface 122 is oriented such that the angle of incidence of the light beam 160 (with respect to the surface normal 110) is greater than a critical angle associated with the surface 122. As a result, the light beam 160 can reflect off the surface 122 via total internal reflection (TIR). Upon reflection, the light beam 160 impinges surface 132 (having a surface normal 112), which can serve as a mirror to the light beam 160. The surface 132 can include, for example, a silvered layer or an anti-reflection coating to reflect the light beam 160 (e.g., such that light is reflected at all angles of incidents between −90 and 90 degrees). Upon reflection off the surface 132, the light beam 160 is directed out of the optical element 104 (e.g., via the surface 122) and into the field of view 174 of the eye 170.

Other light beams (not shown) can be redirected to into the field of view 174 of the eye 170 by other optical elements 102, 106, and 108 (e.g., in the manner described for optical element 104). In some implementations, a redirected beam may not be outside the field of view prior to its interaction with the optical element. However, redirection of the aforementioned light beams can improve the quality of image observed by the eye 170 (e.g., generate a contiguous image that includes image portion in the field of view and image portions in the region of visual loss).

Design of optical system 100 with TIR-based optical elements (e.g., optical elements that allow for TIR at one of their surfaces) can provide many technical advantages. Surfaces associated with TIR (e.g., surfaces 120, 122, 124, 126) may not require a silver/anti-reflection coating to reflect light. As a result, the TIR surfaces can be used for both reflection and transmission of light beam. This can lead to a compact design of the optical system. The optical system 100 can be designed with gaps between the optical elements 102, 104, 106, 108 (e.g., air gaps). This can reduce the curvature associated with the optical system (e.g., curvature associated with image facing surfaces 140, 142, 146, 148).

Additionally, higher number of optical elements can be included in the optical system 100 which can allow the optical system 100 to cover larger regions of visual loss (e.g., widen the field of view). Furthermore, smaller, lighter and less protruding optical elements can be used in the optical system 100 making theta cosmetically acceptable and easy to couple with standard eye glasses.

TIR-based optical elements (e.g., Bauernfeind prisms, and the like) can reduce chromatic dispersion of the light beam at the air optical element interface and other prismatic effects. This can be achieved, for example, by arranging the TIR optical elements such that the light beam enters or exits the optical element via surfaces 120, 122, 124 and 126) at small incident angles with respect to a normal of a surface of the optical element (e.g., small angle between the optical beam 160 and the normal 114 of surface 122). Additionally, TIR-based optical elements can be designed to minimize unwanted reflections, loss due to TIR, and vignetting. Furthermore, the optical system 100 can be designed to take into account the displacement of the pupil of the eye during the rotation of the eye, impact of eye scanning on both sides, and consistency in visual field during expected eye movements.

The design consideration of the optical system 100 can include the orientation and geometry of the optical elements (102-108) such as dimensions of the surfaces of the optical elements and the angle between them. In some implementations, the optical elements can include 4 mm×4 mm half penta-prisms, 4 mm×8 mm half penta-prisms, 8 mm×4 mm half-penta-prisms, 8 mm×8 mm half penta-prisms, and the like. In some implementations, dimensions of the surfaces (e.g. surfaces 120-186) can range from 2 mm to 14 mm as illustrated in FIGS. 15A-15D. The unit of length in the aforementioned figures is millimeters mm).

Angles between the optical elements (e.g., 102, 104, 106, 108, etc.) can depend on the distance between the eye and the optical system. The angle between surfaces 130 and 122, surfaces 132 and 124 and surfaces 134 and 126, can range from 0 degrees to 22.5 degrees. In some implementations, the angle between surfaces 134 and 126 can be less than the angle between surfaces 132 and 124, which in turn can be less than the angle between surfaces 130 and 122. For example, the angle between surfaces 130 and 122, surfaces 132 and 124 and surfaces 134 and 126 can be 7.5 degrees, 6.1 degrees and 4.5 degrees respectively.

In one implementation, the optical system can be mounted on a spectacle lens where optical element 104 can be ahead of the spectacle lens (e.g, downstream relative to the spectacle lens along the field of view axis 172). Optical element 102 may be partially embedded in the spectacle lens. The distance between the spectacle lens and the cornea of the eye 170 (referred to as "the vertex distance") can be set such that contact between the spectacle lens and eyelashes is prevented. In some implementations, the vertex distance can range from 12 mm to 14 mm. The spectacle lens thickness can range between 2 mm and 3 mm, and the distance between the cornea to the entrance pupil of the eye 170 (which can be a point of reference) be about 4 mm.

The angle between the optical elements (e.g., angle between surfaces 130 and 122, 132 and 124, and 134 and 126) can be determined based on, for example, the desirable change in the field of view of the eye 170 due to the optical system 100. In one implementation, the angle between the optical elements can be determined to avoid diplopia (overlapping of the fields seen with two adjacent prisms) and blind spots (missing views between the views from two adjacent optical elements). The values of the aforementioned angles can be about 15 degrees.

Figure 2B:
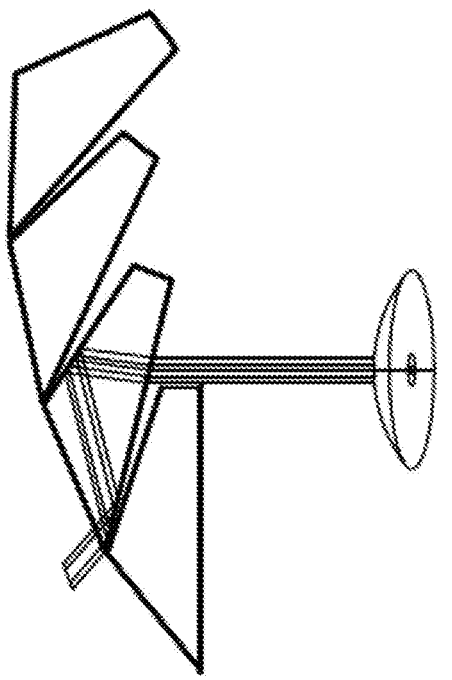
FIGS. 2A-2D illustrate paths of light beams interacting with an optical system.
Figure 2D:
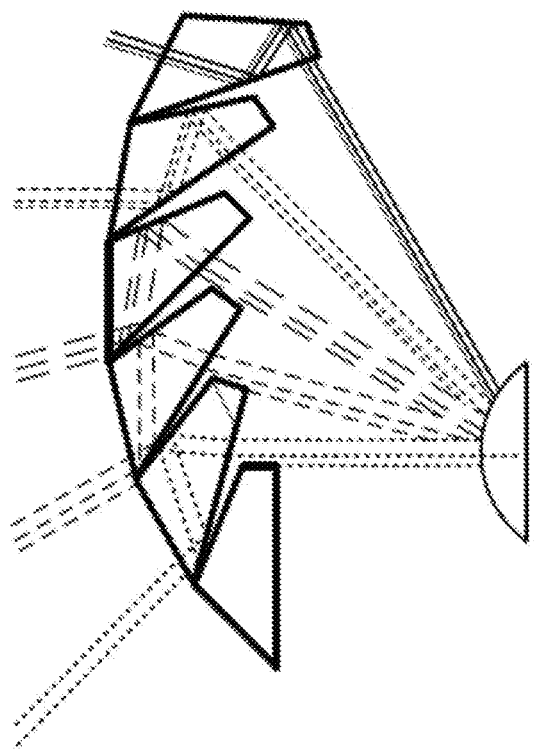
Figure 2A:
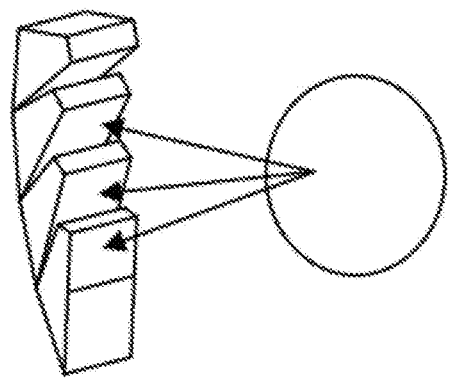
Figure 2C:
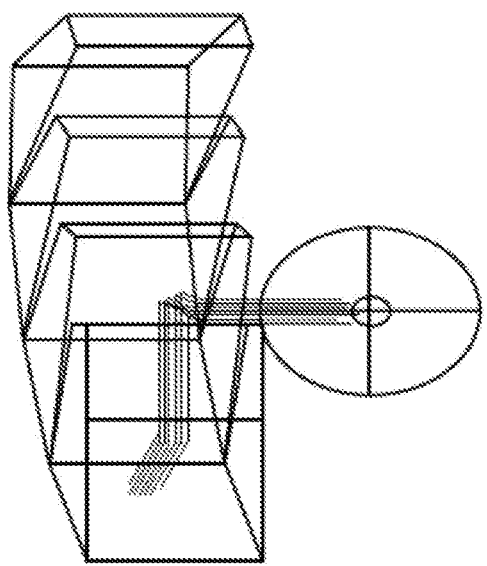

FIGS. 2A-2D illustrate paths of light beam detected by the eye 170. FIG. 2A illustrates an exemplary design of the optical element 100 that includes cascaded optical elements (e.g. half penta prisms). The circle represents an eye (e.g., eye 170) and the arrows represent the path of light beams from the optical element 100 to the eye. Each optical element includes a TIR surface shaded surface). FIG. 2B illustrates the trace of a light beam that impinges on the eye that has a primary position gaze (e.g., eye 170 gazing along the axis 172). FIG. 2C illustrates a three dimensional (3D) trace of a light beam through an optical system including four 10 mm half penta prisms. FIG. 2D illustrates an optical systems composed of 6 optical elements (e.g., 8 mm half penta prisms). The penta prisms can include a square image facing surface (e.g., image facing surface 142).

Figure 3A:
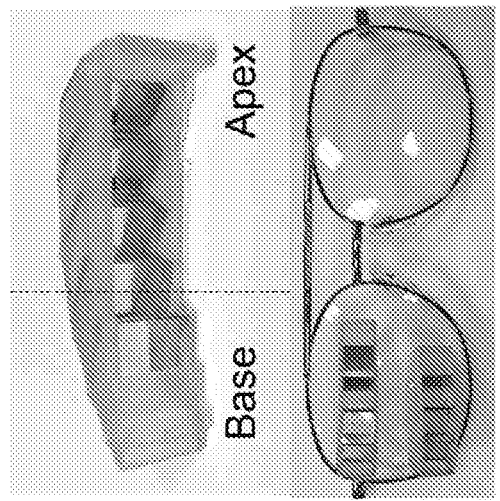
FIGS. 3A-C illustrate an optical system and a shift in image due to the optical system.
Figure 3B:
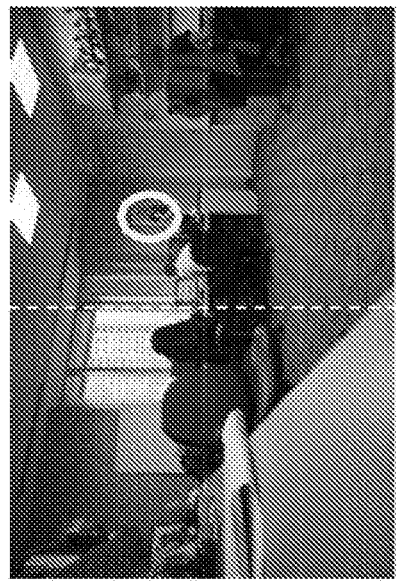
Figure 3C:
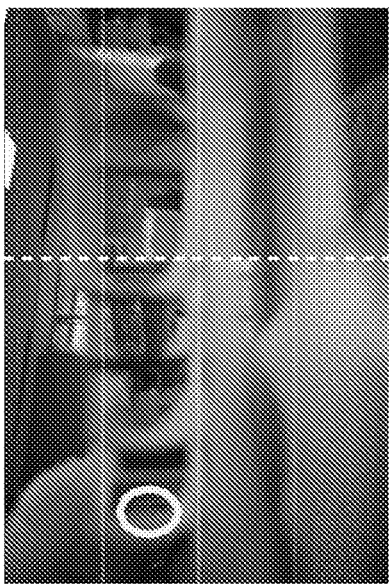

FIGS. 3A-C illustrate an image shift due to an optical system. FIG. 3A illustrates the optical system constructed from half penta prisms having a width of 13 mm and the optical system mounted on a lens. FIG. 3B illustrates an image from a camera without the optical system. FIG. 3C illustrates an image obtained from the camera after the optical system of FIG. 3A is placed in the path of light impinging the camera aperture. Due to the optical system, the location of a portion of the image (indicated by a superimposed circle) is shifted to the left in FIG. 3C when compared to FIG. 3B.

Figure 4B:
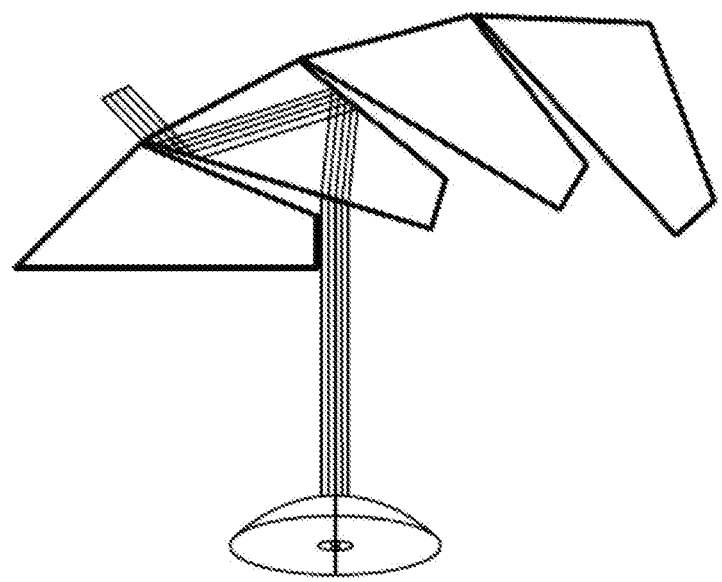
FIGS. 4A-B illustrate simulated ray traces for optical systems that having varying properties.
Figure 4A:
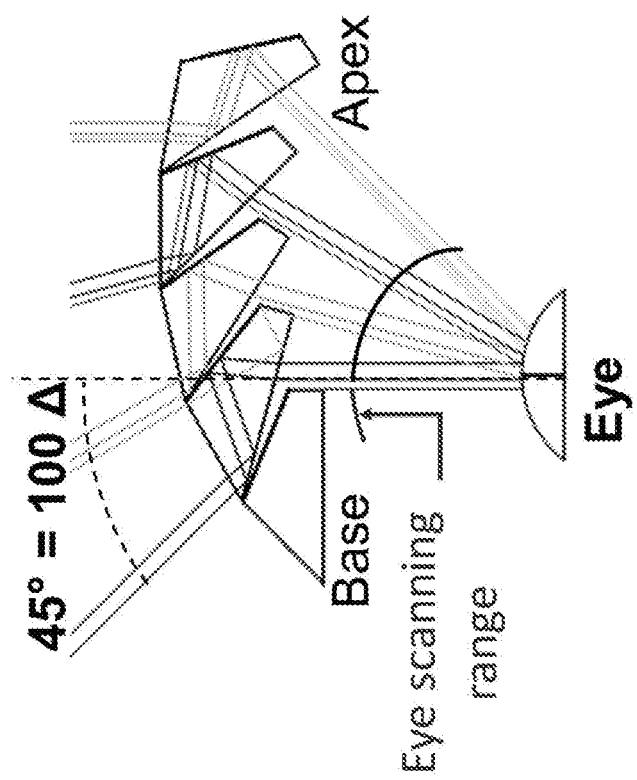

FIGS. 4A-B illustrate simulated ray traces for optical systems that having varying properties (e.g., number of optical elements, orientation and geometry of optical elements, and the like). Varying the properties of the optical system can improve cosmetics, facial ergonomic, and eye scanning strategies.

FIGS. 5A-E illustrate optical systems designed using half penta prisms. FIGS. 5A-C illustrate optical system designs showing elevation of an upper segment designed to reduce the field blocking at the nonimaging edges of the half penta prisms. FIGS. 5D-E illustrate oblique prism designs using half penta prisms that can be constructed from single square elements or from longer elements that can be cut to fit oblique designs of peripheral prism.

It can be desirable to create half penta prisms like elements that expand in the vertical dimension from the narrow end (e.g., proximal to the eye) to the wide end (e.g., distal from the eye). Such a design can enable control of the slight vertical field limitation in the vertical dimension. The reduction in the vertical span of the field through the prism can also be improved (e.g., reduced) with smaller elements. The prisms can be separated using non-shifting elements, which can transform the device into a multiplexing prism like device that has numerous other applications (e.g., monocular applications). In some implementations, the prisms can include Bauernfeind 60-deg prims that can broaden the field of view by 60 degrees.

Figure 6A:
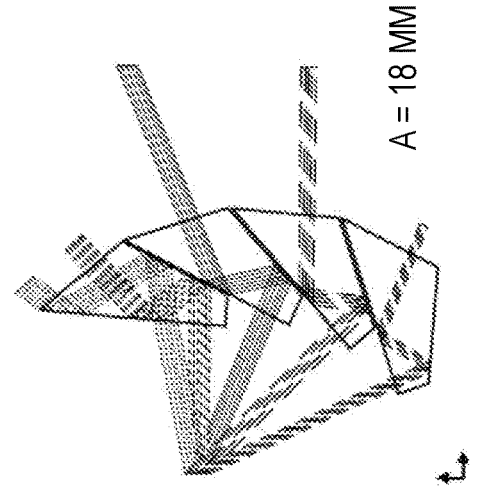
FIGS. 6A-F illustrate traces of light beams impinging on various optical systems.
Figure 6B:
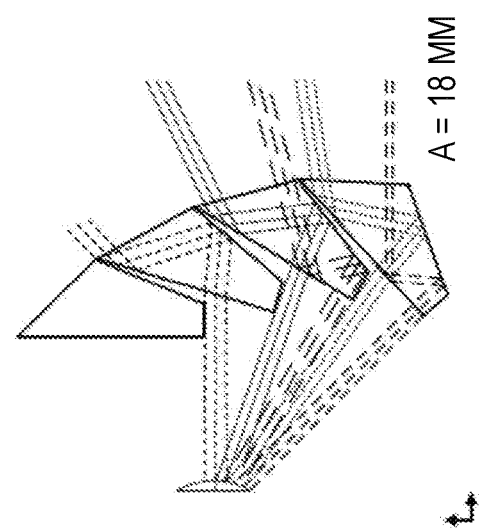
Figure 6C:
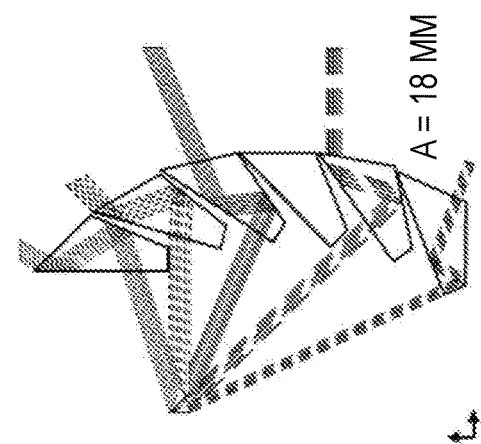
Figure 6D:
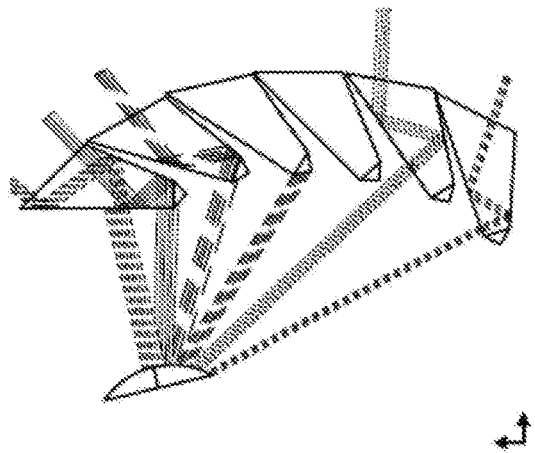
Figure 6E:
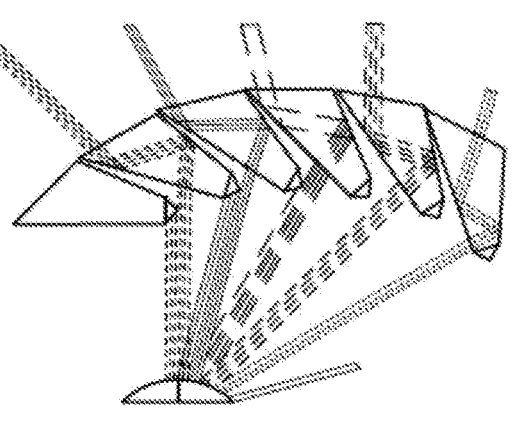

FIGS. 6A-F illustrate traces of light beams impinging various optical systems. In FIG. 6A, light beams are oriented at 12, 0, −22.5, −45, and −65 degrees with respect to the horizontal z axis. In FIG. 6B, light beams are oriented at 0, −19, −30, −35 and −65 degrees with respect to the horizontal z axis. In FIGS. 6A and 6B, the pupil distance (from the optical system) and the orientation of the optical system are 13.8 mm and 5 degrees, respectively. In FIG. 6C, light beams are oriented at 19, 0, −22.5, −30, −45 and −65 degrees with respect to the horizontal z axis. The optical system is oriented at a zero degree angle and the pupil distance is 14.5 mm. FIG. 6D illustrates the geometries of two optical systems. In FIG. 6E, light beams are oriented at 0, −22.5, −45, and −67.5 degrees with respect to the horizontal z axis.

Figure 6F:
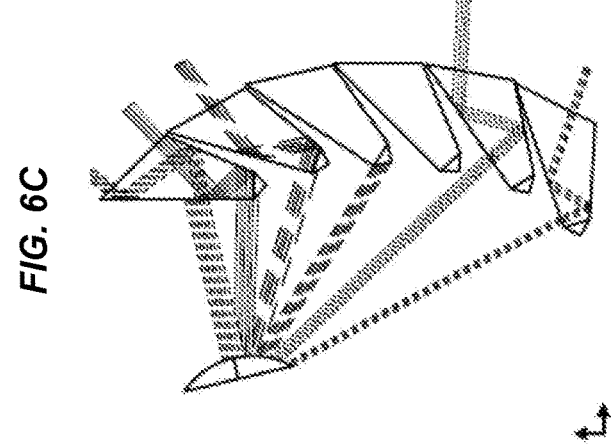

The eye is tilted at zero degrees with respect to the horizontal z axis, and the pupil distance is 14 mm. In FIG. 6F, light beams are oriented at 0, −22.5, −45, and −67.5 degrees with respect to the horizontal z axis. The eye is tilted at 13.2 degrees with respect to the horizontal z axis, and the pupil distance is 14 mm.

In some implementations, the visual field expansion system can include a holder system. In some implementations, the holder can include housing to provide accurate positioning of each optical element including appropriate angles and spacing between optical elements. In addition, the holder can provide a contact free space at the TIR surface for each element. In some implementations, the holder can provide a system for mounting the optical elements into a spectacle lens at positions and angles relative to a wearer's eye that will enable visual field expansion. The visual field expansion system can be positioned at multiple locations and orientation relative to the eye 170. The choice of orientation and location can be the result of various constraints of the optical system 100. For example, decreasing the size of the optical system (e.g., by bringing the optical system closer to the eye 170) can increase the field of view covered by each prism. However, due to safety considerations, it can be desirable to place the optical system outside the spectacle lens. Such an arrangement can allow for refractive error correction provided by the spectacle lens. The size and number of the optical elements can be chosen based on the protrusion size and weight of the optical system (e.g., to decrease the protrusion size/optical system weight). The angle between the separate optical elements can determine the curvature of the optical system (e.g., larger the curvature more the protrusion of the optical system). The larger the angle between the optical elements (e.g., angle between surfaces 130 and 122) the flatter is the system. Increase in the curvature can result in undesirable interactions between the fields of adjacent optical elements. For example, moving from FIG. 6A to 6B increases the angle between the optical elements/flattens the optical system and can provide a complete coverage of the field.

Figure 7:
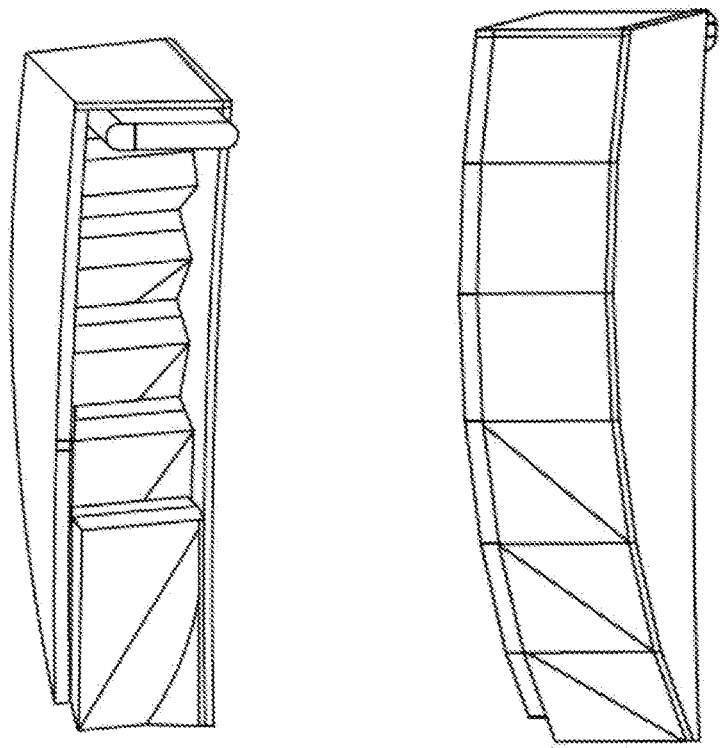
FIG. 7 illustrates a series of CAD images showing a CAD design of the example holder system for half penta prisms.
Figure 7:
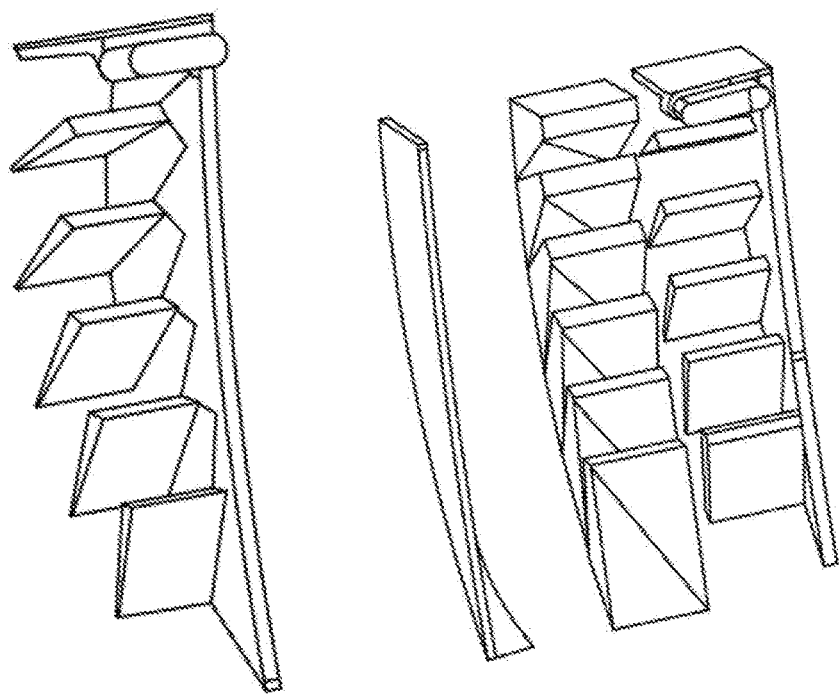
Figure 8:
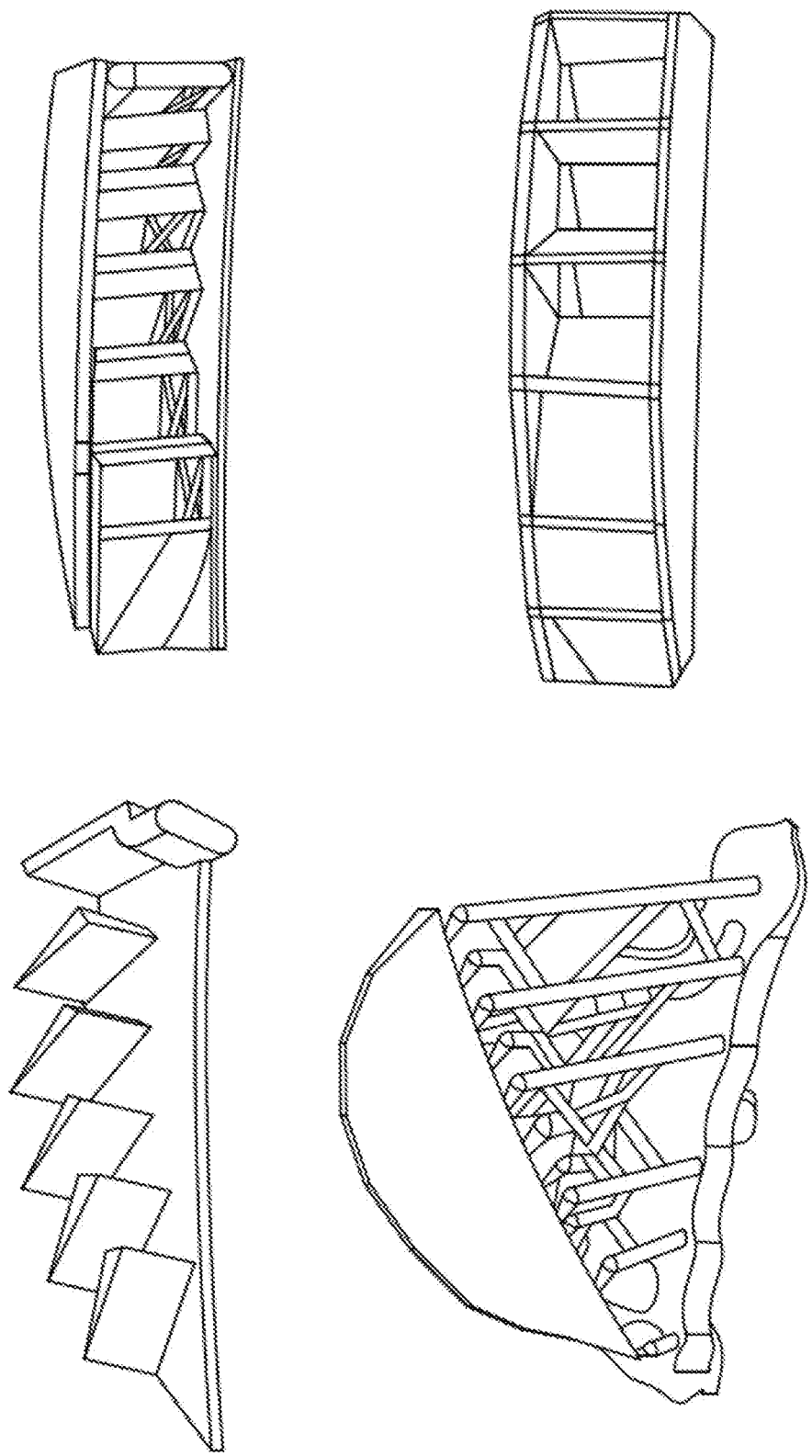
FIG. 8 illustrates 3D-printed holder system and a prototype module of a cascade of half penta prisms.

An example holder system is illustrated in FIGS. 7-9. FIG. 7 illustrates a series of CAD images showing a CAD design of the example holder system for half penta prisms. FIG. 8 illustrates 3D-printed holder system and a prototype module of a cascade of half penta prisms. The example holder includes wedge separators that include tiny protrusions on the front end of the wedge separators to maintain air space at the TIR surface of optical elements.

In some implementations, the field expansion system can be mounted to or integrated with a spectacle lens. In an example implementation, the system is mounted in an upper periphery in one lens (unilateral fitting) combined with standard fellow lens that cover the field replaced by the prism view (FIG. 8A-D). Although the device is mounted on the left lens it is designed for field expansion of right hemianopia patients (blind in right half of visual field in both eyes). The field expansion system can be located on any desired region of the lens. For example, FIG. 9D illustrates an example field expansion system mounted in the central field of the lens.

Figure 9A:
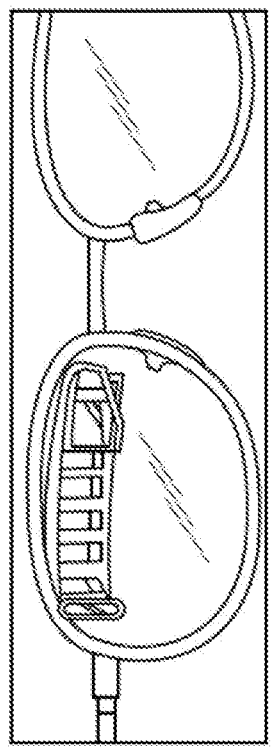
FIG. 9A-D illustrates an example implementation where the field expansion system is mounted in a spectacle for right hemianopia patients.
Figure 9B:
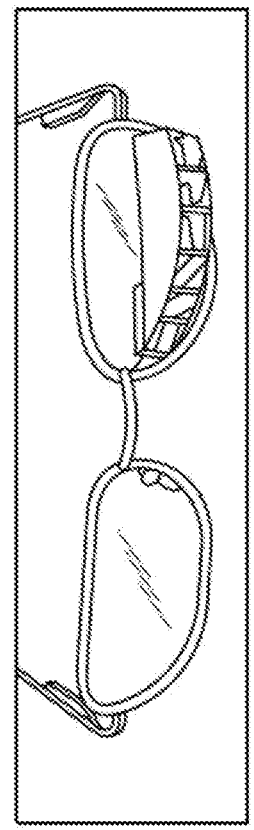
Figure 9C:
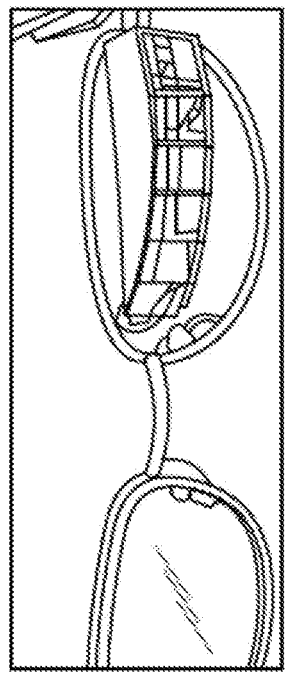
Figure 9D:
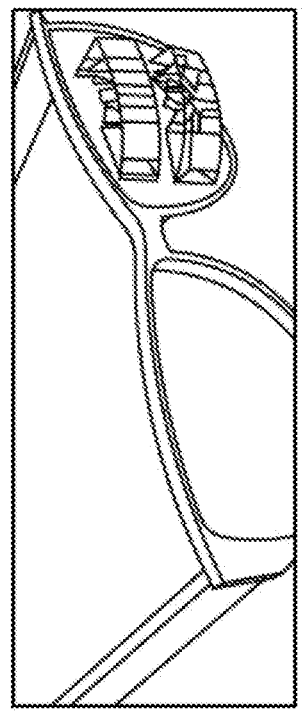

FIG. 9A-D illustrates an example implementation where the field expansion system is mounted in a spectacle for right hemianopia patients. At FIG. 9A, an example implementation with the upper prism-like device mounted at an angle of 20 degrees photographed from the front of the lens. FIG. 9B illustrates the same example system viewed from the patient (e.g., wearer) side. Mounting holes can be formed through the carrier lens. FIG. 9C illustrates a 3D rendered image of the final CAD design of a device for a patient with right homonymous hemianopia. In some implementations, the holder can be a transparent molded device as shown here or a silvered device. In some implementations, a lower prism can be mounted on the right lens. FIG. 9D illustrates an example implementation produced with the field expansion system in the middle of the lens.

In one implementation, at least one edge of the image facing surfaces (e.g., 140, 142, 146, 148) can be about 13 mm. In some implementations, at least one edge of the image facing surfaces can be about 8 mm. For example, the dimensions of the image facing surface can be 4×8 mm (FIG. 15C), 8×8 mm (FIG. 15D), and the like. In other implementations, at least one edge of the image facing surfaces can be about 4 mm. For example, the dimensions of the image facing surface can be 4×4 mm (FIG. 15A), 8×4 mm (FIG. 15D), and the like. Using smaller prisms can decrease the size of the optical system 100, decrease the curvature of the optical system (e.g., curvature associated with surfaces 140, 143, 146 and 148).

Figure 10:
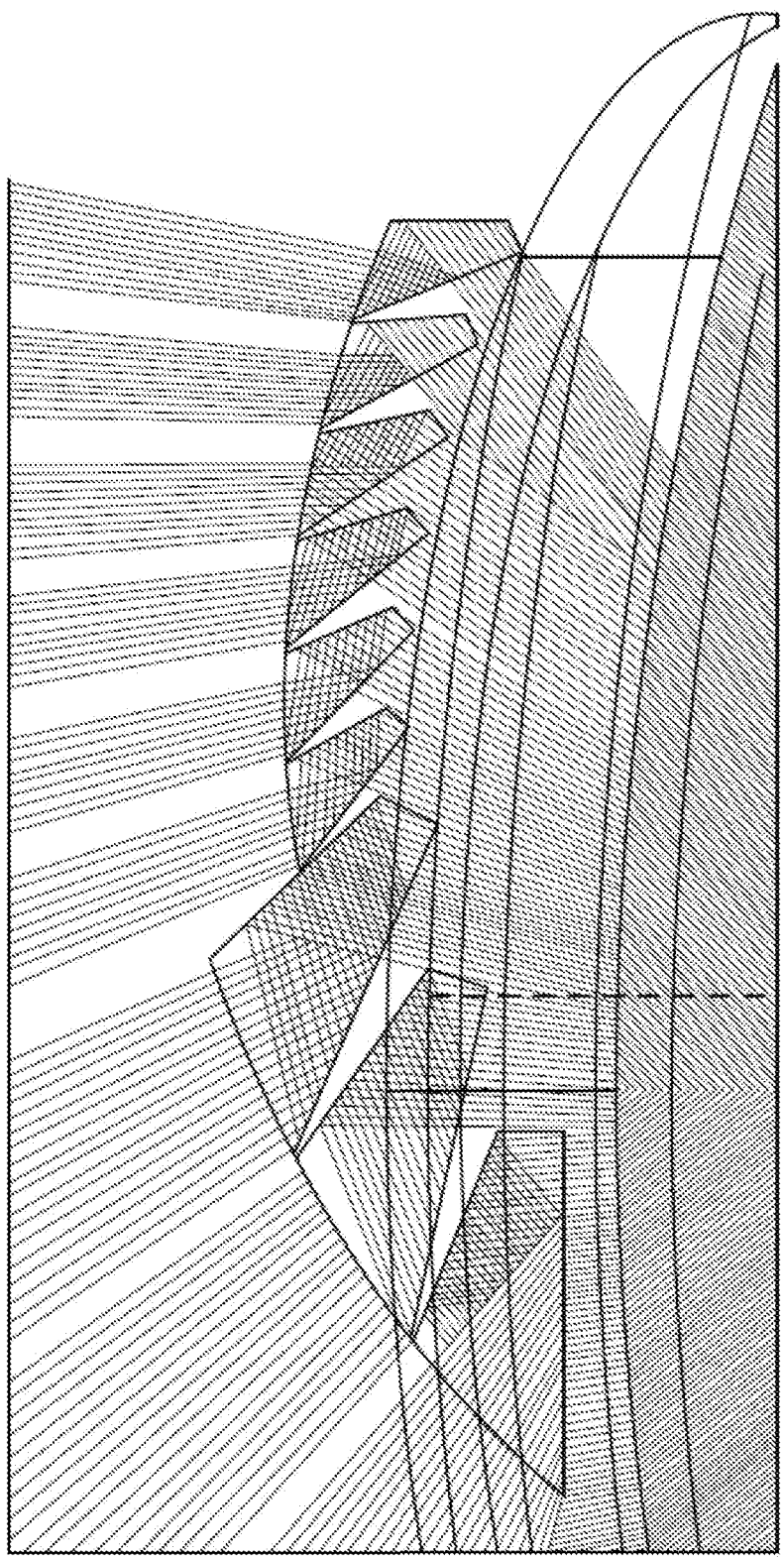
FIG. 10 illustrates ray tracing of a hybrid design having elements of different sizes.

A field expansion system with smaller prism (e.g., 4×8 mm) can provide for better cosmetics. In the implementation illustrated in FIG. 10, although smaller elements are used, the overall protrusion of the field expansion system is not improved as the complete module arcs farther from the carrier lens. FIG. 10 illustrates ray tracing of a hybrid design having elements of different sizes (e.g., 8×8 and 4×8 elements). For example, for a 4×8 mm optical element, 4 mm represents the width of the optical element (e.g., width is the dimension parallel to the plane of x-z plane in FIG. 1), and 8 mm represents the height of the optical element (e.g., perpendicular to the x-z plane in FIG. 1).

In one implementation, the height of the optical element can be 8 mm, which can allow the prism to fit on a spectacle lens. For example, this can provide about 20 degrees along the height dimension (e.g, perpendicular to the x-z plane) to the expanded field (e.g., by the peripheral prism). The dimensions of the optical element can be based on design tradeoffs. For example, reducing the size of the optical element may result in reduction in the field of view. Increasing the size of the optical element may make it incompatible with the spectacle frame (e.g., the optical element may extend beyond the spectacle frame).

Retinitis Pigmentosa (RP) patients suffering with tunnel vision can have a reduced field of view (e.g., the vertical field of view can be less than 10 degrees). An optical element having a small vertical extent (e.g., 4 mm) may not be able to correct tunnel vision of RP patients. Reducing the height of the optical element can reduce the overall size and weight of the optical element, but may not impact the protrusion of the optical system with respect to the spectacle frame.

In some implementations, the height and width of the optical elements can be independent of each other. Independent selection of height and width of the optical elements can result in smaller sizes of the optical elements with closer proximity to the carrier lens. Some implementations can include three 8×8 mm half penta prisms combined with six 4×8 mm half penta prisms. This design can result in a smaller and lighter device. The non-imaging breaks in the optical paths can be parallel. In some implementations, angular size can decrease as the distance from the user increases.

Figure 11A:
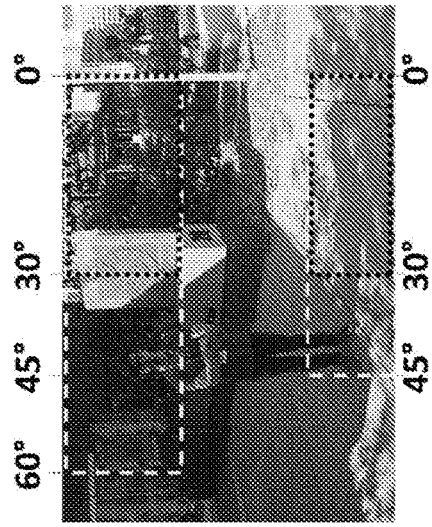
FIG. 11A-C illustrates a panoramic composite image of a street view and comparison between two field expansion devices.
Figure 11C:
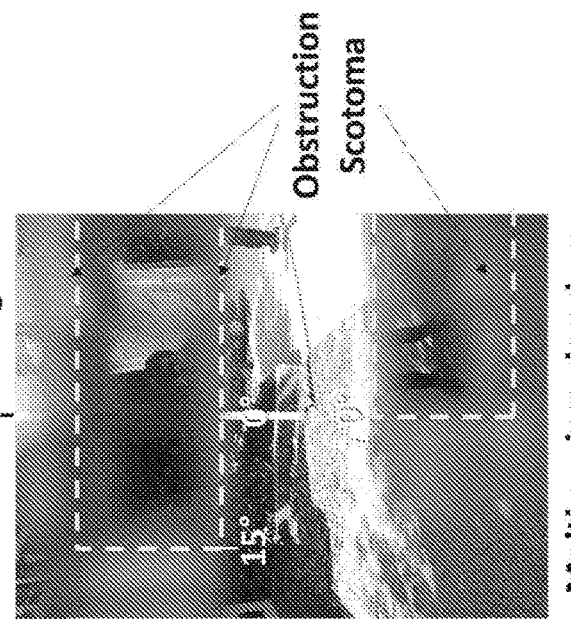
Figure 11B:
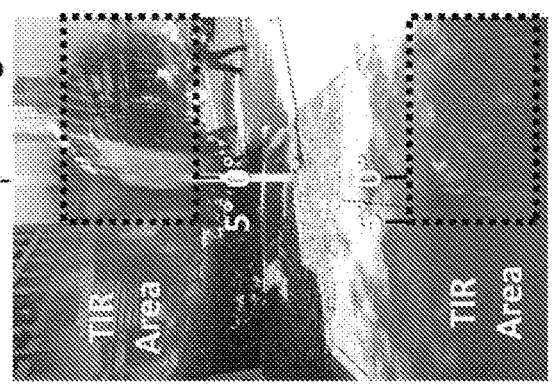

FIG. 11A illustrates a panoramic composite image of a street view. A street lamp pole is located about 30 degrees (dashed line) from the 0 degree black dashed line (indicating lens center in FIGS. 11B and 11C). The same scene was photographed with an example implementation of the current subject matter and using a vision simulation camera to illustrate the impact of (FIG. 11C) the example field expansion system and to compare both the magnitude of the shift and the image quality with (FIG. 11B) a currently available conventional prism of 30 degrees deviation. FIG. 11B is a photograph taken through spectacle lens with a conventional 57 prism diopter (30 degrees) peripheral upper prism for a person with right hemianopia fixating at the center of the image (black dashed line). Showing a left shifted image of the tree crown and the street lamp from the blind right side. The limit on visibility and eye scanning imposed by TIR (highlighted by a line start at just 5 degrees right of the straight ahead). The shifted view in the prism is highly compressed and is low in contrast and quality. The blurred ellipse in the bottom of the image is due to the empty pocket of the lower prism. FIG. 11C illustrates a photo taken with the example implementation of field expansion system. The prism shift of 45 degrees brings the building (well beyond the pole of street lamp) in the blind side into the view while shifting the tree crown and the pole of the street lamp further to the left. The TIR limit is farther to the right (15~20 degrees) enabling more benefit from eye scanning into the blind side. FIG. 11C illustrates an improved quality of the shifted image (higher contrast, less distortion, and less color dispersion) compared to the image in FIG. 11B.

Hemianopia, the loss of half of the visual field on one side in both eyes, is a common result of strokes and other brain injuries, affecting 0.8% of people 50 years or older in the USA. Patients are restricted from driving in many states and countries (though they are permitted in others) and complain of other difficulties. Prisms designed to shift portions of a scene from the blind side to the residual field are simple, light, cost effective, and efficient. Example peripheral prism glasses include THE PELI LENS™ and THE PELI PRISM™. These prism glasses expand the visual field by as much as 30 degrees (out of the 90 degrees lost) and significantly improve hazard detection when walking by individuals with hemianopia. In randomized controlled clinical trials, 74% of patients found the device useful; 50% continued to wear it for an extended follow-up period and had significantly improved hazards detection on the blind side in driving.

Although prism glasses are successfully helping patients with field loss, a field expansion wider than 30 degrees (currently available) is desirable in many situations. A recent study found that the risk of the collision with other pedestrians (a common complaint) peaks at 45 degrees eccentricity. Peli E, Apfelbaum H, Berson E L, Goldstein R B. (2016), "The risk of pedestrian collisions with peripheral visual field loss. Journal of Vision" 16(15):5, 1-15, doi:10.1167/16.15.5. Current prism glasses (up to 30 degrees) cannot cover the eccentricity of peak collision risk and are expected to protect against just 31% of the collision risk. In addition, the shifted view with these high power prisms is distorted (minified), low contrast, and with false colors. Thus, the impact of field expansion in current prism glasses is below the theoretical expectation. In addition, when patients scan into their blind side to see farther, the current prism limits the effective range of eye scanning with continued expansion to only 5 degrees. A still wider field expansion is desired for many situations and in particular for avoiding collisions with other pedestrians (a common complaint). Peli E, Apfelbaum H, Berson E L, Goldstein R B. (2016), "The risk of pedestrian collisions with peripheral visual field loss. Journal of Vision" 16(15):5, 1-15, doi:10.1167/16.15.5.

Some implementations of the current subject matter can realize a larger expansion of visual field to and above 45 degrees (improvement of 50%) Peli E, Bowers A R, Keeney K, Jung J H. (2016), "High Power Prismatic Devices for Oblique Peripheral Prisms," Optometry and Vision Science, 93(5): 521-533. doi: 10.1097/OPX.0000000000000820; and Peli E. Peripheral Field Expansion Device, U.S. Pat. No. 7,374,284. FIG. 12A-D illustrates differences between the principles of conventional prism and mirror-based prisms. The light rays are shown as emerging from the eye but in fact optic is reversible so the light getting to the eye can be traced on the same lines. In a conventional prism structure, the desired higher deflection light path (dashed line in FIG. 12B for 45 degrees shift) is not available as Fresnel prism because it exceeds the critical angle and limits the effective eye scanning range even further. In contrast, the mirror-based prism can deflect the light path at the desired higher angle with lower level distortion and better contrast and color due to the imaging based mostly on reflection instead of refraction.

Figure 12A:
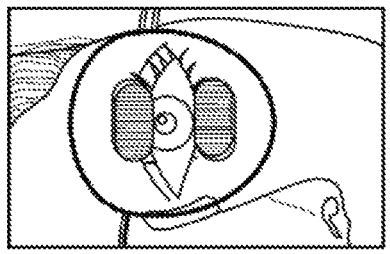
FIG. 12A-D illustrates the difference between the principles of conventional prism and mirror-based prisms.
Figure 12B:
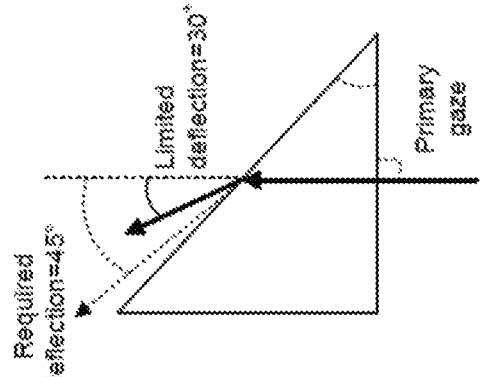
Figure 12C:
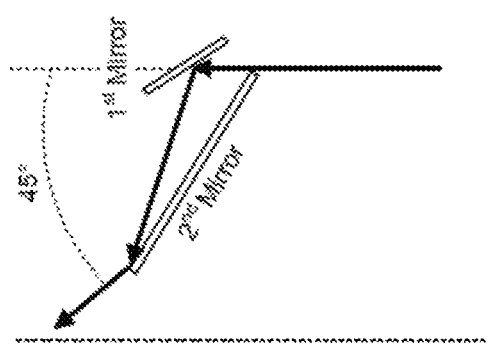
Figure 12D:
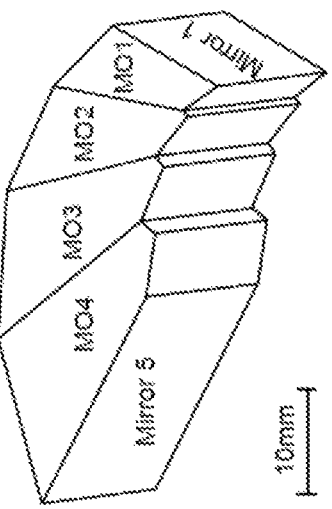

FIG. 12A illustrates a photo of peripheral prism (PELT LENS™), conventional Fresnel-30 degrees deflection, for hemianopia patients, FIG. 12B illustrates a conventional prism for 30 degrees deflection with its optical power (dashed line for desired 45 degrees deflection), FIG. 12C illustrates a mirror-based prism element realizing higher optical power (45 degrees deflection) with lower artifacts, and FIG. 12D illustrates a 3D structure of a mirror-based prism device.

An example mirror-based prism device composed of four mirror pair modules (MO1~MO4) as shown in the right side of FIG. 12D that provides deflection of 45 degrees and field of view of 60 degrees. Although it is possible to realize a single mirror-based prism with those specifications, the size of device could be too big (up to 100 mm) and impractical to attach to glasses. Therefore, the design is divided into multiple smaller modules in a Fresnel-prism-like design. In this design, the angle of deflection derived from reflection is limited to reduce the curving and spiraling of the complete module. To compensate for that loss in deflection power, the eye facing surface of the element is tilted to add prismatic power.

Figure 13:
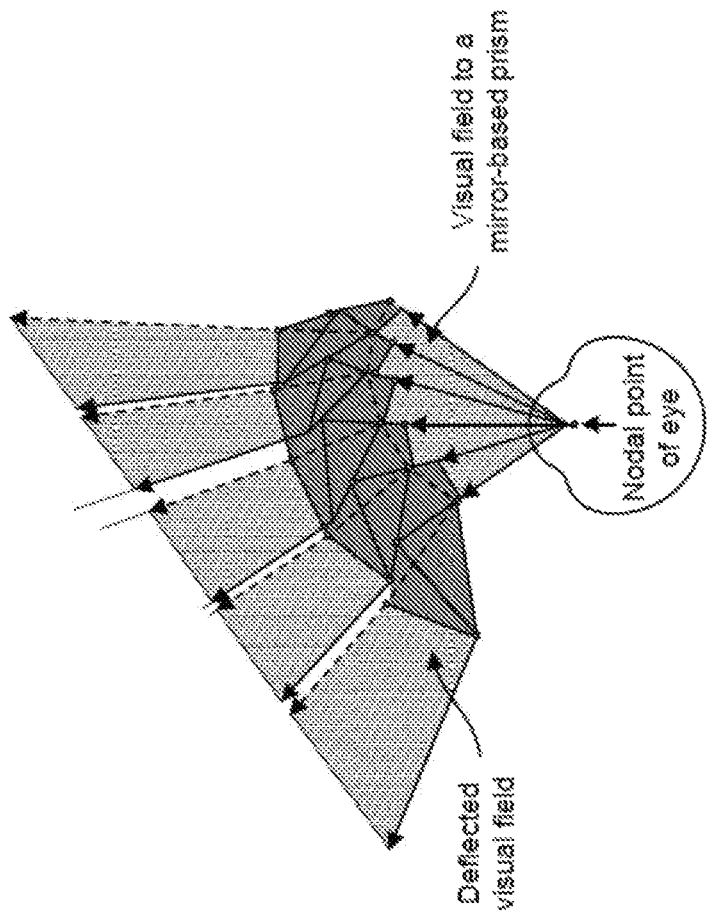
FIGS. 13A-B illustrate ray traces of light beams from mirror-based prism device illustrated in FIG. 12D.
Figure 13:
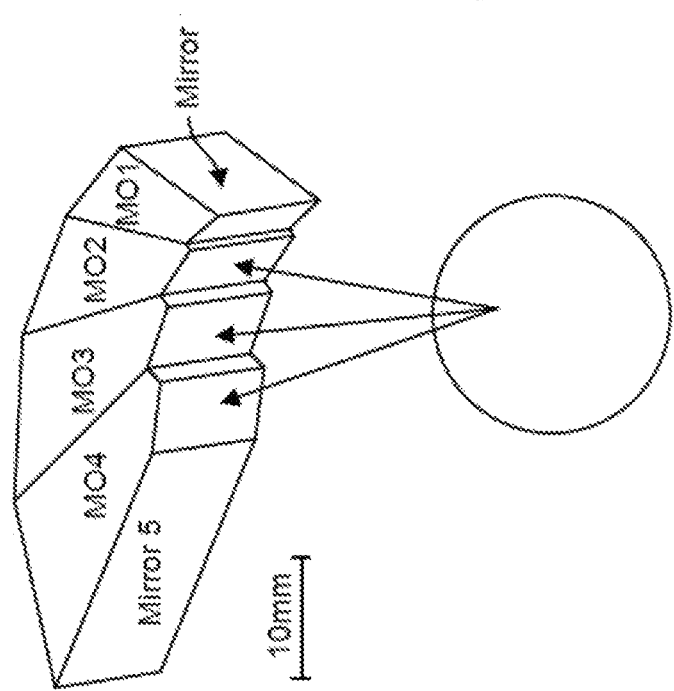

FIGS. 13A-B illustrate ray traces of light beams from mirror-based prism device illustrated in FIG. 12D. FIGS. 14A-B illustrate visual applications of half penta prisms are in rock climbing (FIG. 14A) and TV bed glasses (FIG. 14B). Half penta prisms can also be used in keplerian telescopes and binoculars forming part visual reversing unit (for example in combination with a roof prism).

In one implementation, a first unit including optical elements (e.g., made of glass, quartz, plastic and the like) is produced from a single mold. The optical elements of the first unit are connected via their image facing surfaces to hold them together. A second molded unit is made to fit in between the aforementioned optical elements. The first and the second units are glued together and then mounted to a lens of an eye glass. FIGS. 15C and 15D illustrate half penta prisms arranged in an oblique design. Each half penta prism can be rotated around the visual axis 172. This can result in light beams being directed into the (vertical) peripheral retinal locations coming from a more central field location. Since each half penta can be rotated, they can end up in a staggered configuration as shown in the 15C and 15D.

Although a few variations have been described in detail above, other modifications or additions are possible. For example, the current subject matter is not limited to attaching to spectacles but can include other uses, such as attaching to a camera or video lens. For RP/tunnel vision the optical system can include two half penta prisms (e.g., for each eye). The first half penta prism can be located along the primary position of gaze and the second half penta prism can be located along the direction of the putative prism "base" for scanning with the eyes. RP patients may need only 2 half penta prisms of 8×4 mm for each optical system (e.g., one for the right side and one for the left side). In one implementation, a first optical system with two half penta prisms can be located above the line of sight of one eye of the patient, and a second optical system with two half penta prisms can be located below the line of sight of the second eye of the patient.

The subject matter described herein provides many technical advantages. For example, the current subject matter can be quickly manufactured by 3D printing technology. The current subject matter can provide a wide angle field expansion (e.g., between 45 degrees and 60 degrees) over a wide visual field. This can reduce collision events for a person suffering from peripheral field loss. The current subject matter can provide dramatically better image quality and much less distortion (minification), which can improve the detection of hazard by a wearer. The current subject matter can enable a wider range of effective eye scanning range.

In the descriptions above and in the claims, phrases such as "at least one of" or "one or more of" may occur followed by a conjunctive list of elements or features. The term "and/or" may also occur in a list of two or elements or features. Unless otherwise implicitly or explicitly contradicted by the context in which it is used, such a phrase is intended to mean any of the listed elements or features individually or any of the recited elements or features in combination with any of the other recited elements or features. For example, the phrases "at least one of A and B;" "one or more of A and B;" and "A and/or B" are each n tended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." In addition, use of the term "based on," above and in the claims is intended to mean, "based at least in part on," such that an unrecited feature or element is also permissible.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed is:

1. A system comprising:
    a first optical element including a first surface and a second surface, the first surface configured to reflect a first light beam incident on the first surface at a first incident angle greater than a first predetermined angle, and the second surface configured to reflect the reflected first light beam towards a location; and
    a second optical element including a third surface and a fourth surface, the third surface configured to reflect a second light beam incident on the third surface at a second incident angle greater than a second predetermined angle, and the fourth surface configured to reflect the reflected second light beam towards the location;
    wherein the system is configured to shift an image laterally from a first region to a second region, the image characterized by the first light beam and the second light beam;
    wherein the second surface comprises a first reflective layer configured to reflect the reflected first light beam and wherein the fourth surface comprises a second reflective layer configured to reflect the reflected second light beam.

2. The system of claim 1, wherein the second surface of the first optical element and the third surface of the second optical element form an angle.

3. The system of claim 1, further comprising a third optical element including a fifth surface and a sixth surface, the fifth surface configured to reflect a third light beam incident on the fifth surface at an angle greater than a third predetermined angle, and the sixth surface configured to reflect the reflected third light beam towards the location.

4. The system of claim 1, wherein the first optical element and the second optical element include Bauernfeind prisms.

5. The system of claim 1, wherein the first reflective layer is a first silver layer configured to reflect the reflected first light and the second reflective layer is a second silver layer configured to reflect the reflected second light beam.

6. The system of claim 1, wherein the first light beam is incident on the first surface at the angle greater than the first predetermined angle such that the first light beam is totally internally reflected by the first surface.

7. The system of claim 1, wherein the first optical element and the second optical element are arranged to define a volume between the second surface and the third surface.

8. The system of claim 7, wherein the first optical element is formed of a first material having a first refractive index and the volume between the second surface and the third surface is formed of a second material having a second refractive index, wherein the first refractive index is greater than the second refractive index.

9. The system of claim 8, wherein the first material is glass and the second material is ambient air.

10. The system of claim 1, wherein the second surface is adjacent the third surface and defines a separation angle.

11. The system of claim 1, further comprising a housing configured to hold the first optical element and the second optical element.

12. The system of claim 11, wherein the housing is configured to be attachable to a spectacle lens.

13. The system of claim 11, wherein the housing is integral with a lens.

14. The system of claim 11, further comprising a spectacle frame for holding a lens, wherein the housing is attached to the lens.

15. The system of claim 11, further comprising an image acquisition device, wherein the housing is configured to locate the optical elements in a field of view of the image acquisition device.

16. The system of claim 1, wherein the image is shifted by greater than 30 degrees.

17. The system of claim 1, wherein the image is shifted by one of 45 degrees and 60 degrees.

18. The system of claim 1, wherein the lateral shift is with respect to a plane perpendicular to a primary viewing axis.

19. The system of claim 1, wherein the first optical element and the second optical element form part of a distributed cascade of elements.

20. The system of claim 1, wherein the image is shifted by 45 degrees or more.

* * * * *